US008817128B2

(12) United States Patent
Spielberg

(10) Patent No.: US 8,817,128 B2
(45) Date of Patent: Aug. 26, 2014

(54) REAL-TIME ADJUSTMENT OF ILLUMINATION COLOR TEMPERATURE FOR DIGITAL IMAGING APPLICATIONS

(75) Inventor: Anthony Cappa Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 63 days.

(21) Appl. No.: 13/479,784

(22) Filed: May 24, 2012

(65) Prior Publication Data

US 2012/0327264 A1  Dec. 27, 2012

Related U.S. Application Data

(63) Continuation-in-part of application No. 12/796,797, filed on Jun. 9, 2010, now Pat. No. 8,466,984.

(51) Int. Cl.
*H04N 5/228* (2006.01)

(52) U.S. Cl.
USPC ............... 348/222.1; 348/223.1; 348/241; 348/243; 348/370

(58) Field of Classification Search
USPC ............ 348/222.1, 223.1, 241, 243, 370–376
See application file for complete search history.

(56) References Cited

U.S. PATENT DOCUMENTS

| | | | | |
|---|---|---|---|---|
| 6,081,076 | A | 6/2000 | Ogawa | 315/241 |
| 6,379,022 | B1 | 4/2002 | Amerson et al. | 362/231 |
| 7,550,251 | B2 | 6/2009 | McLean et al. | 430/300 |
| 2004/0051796 | A1 | 3/2004 | Kelly et al. | 348/243 |
| 2006/0182436 | A1 | 8/2006 | Tabuchi et al. | 396/287 |
| 2007/0085911 | A1 | 4/2007 | Nakamura | 348/223.1 |
| 2007/0098261 | A1 | 5/2007 | Kojima et al. | 382/167 |
| 2007/0260985 | A1 | 11/2007 | Utagawa et al. | 715/721 |
| 2008/0043133 | A1 | 2/2008 | Sasaki et al. | 348/341 |
| 2008/0043150 | A1 | 2/2008 | Bellis, II et al. | 348/655 |
| 2009/0231468 | A1 | 9/2009 | Yasuda | 348/234 |

(Continued)

FOREIGN PATENT DOCUMENTS

| | | | | |
|---|---|---|---|---|
| JP | 2003324755 A | 11/2003 | | |
| JP | 2005277957 A | 10/2005 | | G03B 7/08 |
| JP | 2007129622 A | 5/2007 | | |
| WO | WO2009108050 A1 | 9/2009 | | G06T 5/50 |

OTHER PUBLICATIONS

Office Action for U.S. Appl. No. 12/796,797 (Spielberg, "Calibrating Color for an Image," filed Jun. 9, 2010), U.S. Patent and Trademark Office, mailed Aug. 29, 2012, 11 pages.
Borman, S.-et al.; "Image Sequence Processing"; Dept of Electrical Engineering; University of Notre Dame; Oct. 14, 2002, 81 pages.

(Continued)

*Primary Examiner* — Yogesh Aggarwal
(74) *Attorney, Agent, or Firm* — VanLeeuwen & VanLeeuwen; Steven L. Bennett

(57) ABSTRACT

An approach is provided to adjust illumination color temperature at a flash unit of a camera. Data that corresponds to the ambient light of a physical environment is collected, such as at a color temperature meter included in the camera. The ambient light has a distribution of color temperatures that cycle over a fixed time period. When a flash request is received, a time is calculated at which the flash unit will flash. One of the color temperatures is identified from the distribution of color temperatures with the identified color temperature being the predicted color of the ambient light that will be present in the physical environment when the flash unit flashes. The color temperature of the flash unit is set to the identified color temperature.

18 Claims, 13 Drawing Sheets

(56) References Cited

U.S. PATENT DOCUMENTS

| | | | | |
|---|---|---|---|---|
| 2009/0285573 | A1 | 11/2009 | Aoyagi | 396/157 |
| 2010/0103310 | A1 | 4/2010 | Lin et al. | 348/366 |
| 2010/0124041 | A1 | 5/2010 | Druchinin | 362/16 |
| 2010/0189429 | A1* | 7/2010 | Butterworth | 396/155 |
| 2010/0254692 | A1 | 10/2010 | Kurt et al. | 396/155 |
| 2010/0302447 | A1 | 12/2010 | Shirai | 348/607 |
| 2010/0322613 | A1* | 12/2010 | Khuntia | 396/157 |

OTHER PUBLICATIONS

Rand, G-et al.; "Working Within Exposure Limits in Digital Photography"; Brooks Institude of Photography; www.sekonic,com/news/review2asp; 2011, 4 pages.

Mayes, JE.-et al.; "High Speed Image Capture for Mechanical Analysis"; IP.COM/IPCOM000080397D; Prior Art Database; Feb. 27, 2005, 4 pages.

* cited by examiner

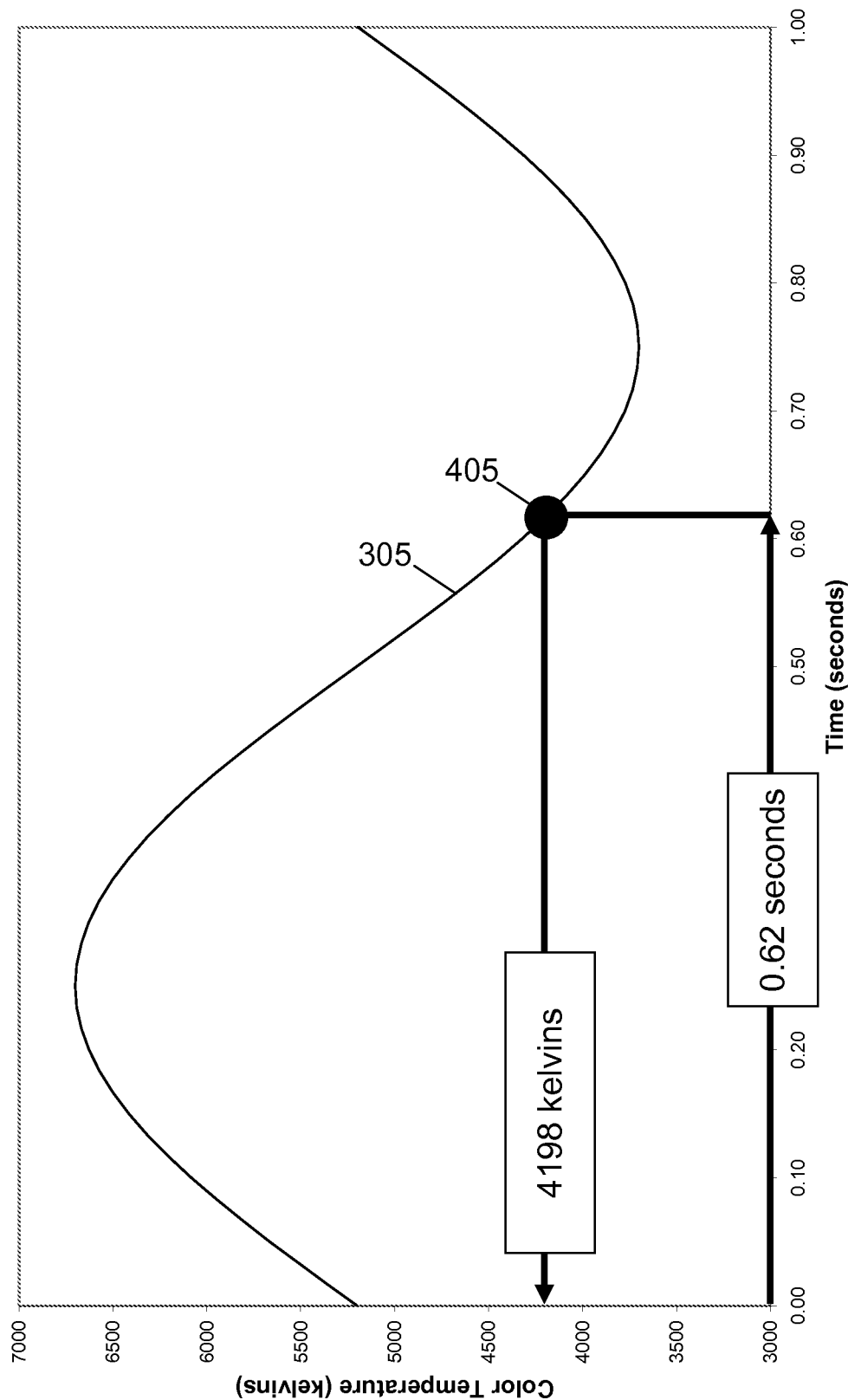

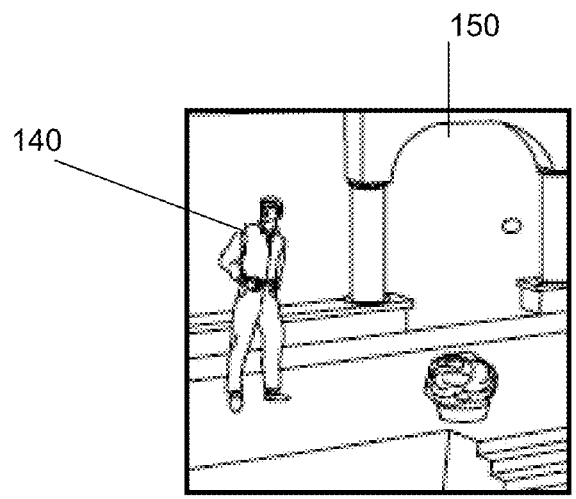
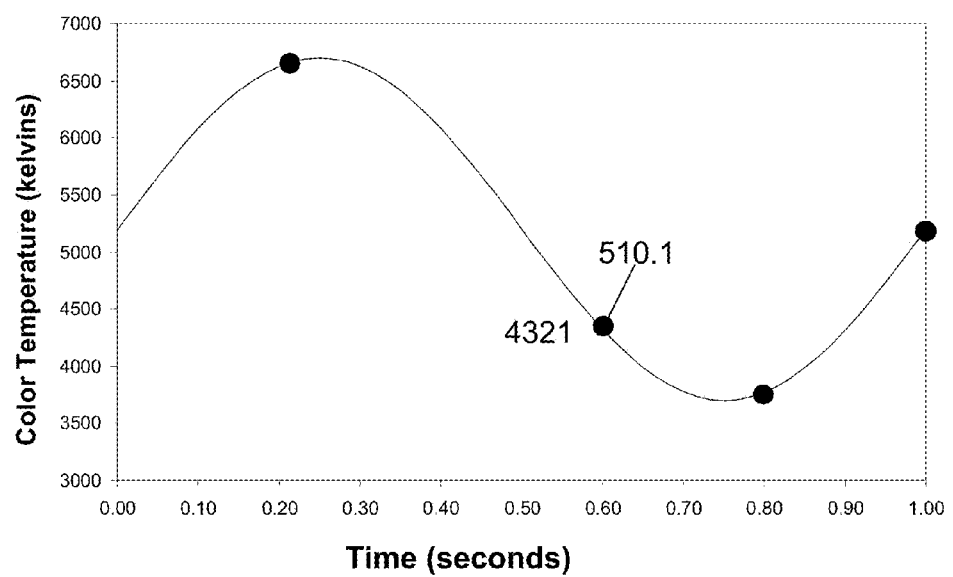
FIG. 5A

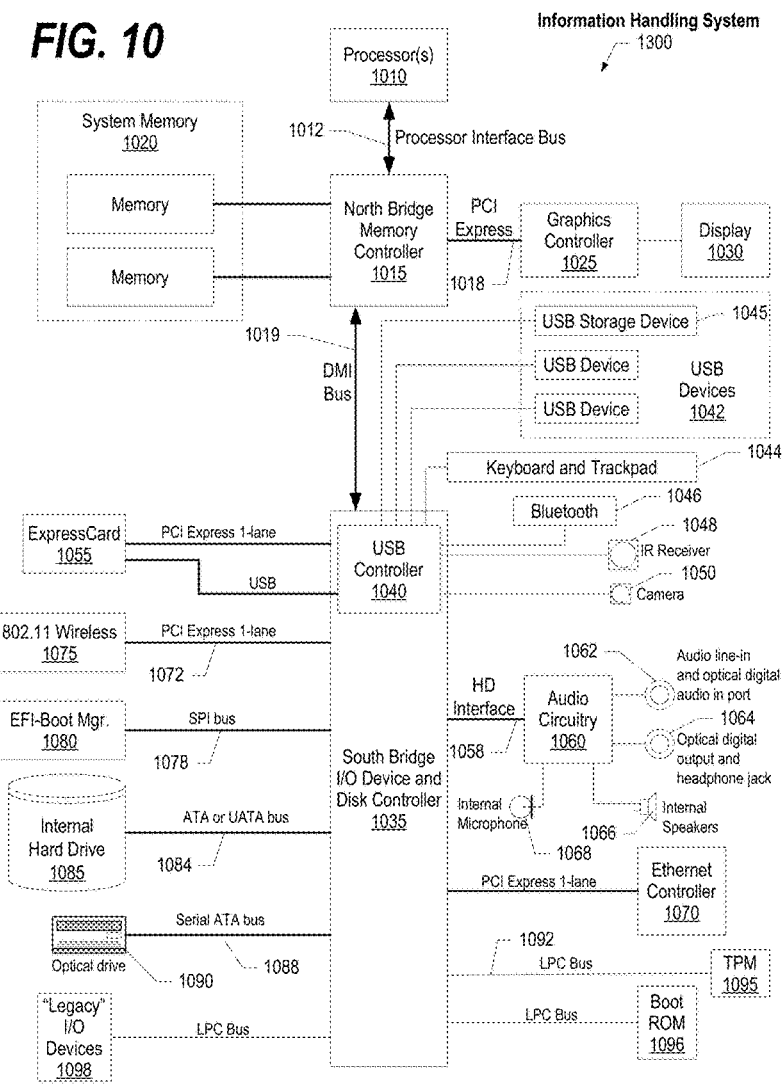

REAL-TIME ADJUSTMENT OF ILLUMINATION COLOR TEMPERATURE FOR DIGITAL IMAGING APPLICATIONS

CROSS-REFERENCE TO RELATED APPLICATION

The present application is a continuation-in-part of U.S. patent application Ser. No. 12/796,797, entitled "Adjusting Color Balance In An Image," filed Jun. 9, 2010, which is incorporated herein by reference in its entirety.

TECHNICAL FIELD

The present invention relates to digital imaging, and more specifically to color correction by calibrating color or adjusting color balance, which may also be known as white balance, gray balance or neutral balance.

BACKGROUND OF THE INVENTION

Because light sources have varying color temperatures, images captured by standard or digital cameras often exhibit a color cast, which causes an image of a subject to appear differently from an image of the subject captured under different lighting. One may adjust the color balance attribute to remove the color casts caused by light sources. Color balance may also be referred to as white balance, gray balance, or neutral balance.

Accurate color rendition is vital in digital imaging, and correct color balance is a key factor in achieving accurate color rendition. Achieving correct color balance is typically accomplished by applying a color temperature profile to a digital image after the image is captured. In cases where the color temperature of the light source is stable over time, this technique often works well. For a group of images taken under a stable light source, the correct color temperature profile need only be determined for the first image in the group, and can then be applied to all the remaining images in the group.

Achieving correct color balance for a group of images becomes more complicated if the color temperature of the light source changes from image to image. In this case, each image must be analyzed individually to determine the correct color temperature profile to apply.

Achieving correct color balance for an image or images illuminated by fluorescent lighting is also complicated. Fluorescent lights change color significantly and continuously at the frequency of the alternating current ("AC") which powers them. For example, fluorescent lights in the United States may change in color at a 60 times per second cycle. Images captured using exposure times shorter than one complete AC cycle may show significant color shifts with respect to each other, and so will require different color temperature profiles for each image to achieve proper white balance. Worse still, if the exposure time is sufficiently short, the images will show a color variation within each image. For example, the top portion of the image will have a different color cast from the middle portion of the image, which will have a different color cast from the bottom portion. In such cases, there is no single color temperature profile which can be applied to the entire image to achieve correct color balance.

SUMMARY

An approach is provided to adjust illumination color temperature at a flash unit of a camera. In this approach, data that corresponds to the ambient light of a physical environment is collected, such as at a color temperature meter included in the camera. The ambient light has a distribution of color temperatures that cycle over a fixed time period. When a flash request is received, a time is calculated at which the flash unit will flash. One of the color temperatures is identified from the distribution of color temperatures with the identified color temperature being the predicted color of the ambient light that will be present in the physical environment when the flash unit flashes. The color temperature of the flash unit, such as an LED flash unit, is set to the identified color temperature. In this manner, the camera, such as a digital single-lens reflex camera, captures an image using a flash with the same color temperature as found in the ambient light in the physical environment.

In one embodiment, a subject image of a subject is captured for a determined exposure time. In the subject image, the subject is illuminated by the light source. Exposure time data is associated to the subject image. At least one subject color balance adjustment is calculated for the subject image from the exposure time data and the color spectrum model.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 4 illustrates a color balance adjustment indicated by the color spectrum model of FIG. 3;

FIG. 5A illustrates calculating a color balance adjustment for the subject image;

FIG. 10 is a block diagram of an information handling system upon which the methods described herein can be implemented.

DETAILED DESCRIPTION

Figure 1:
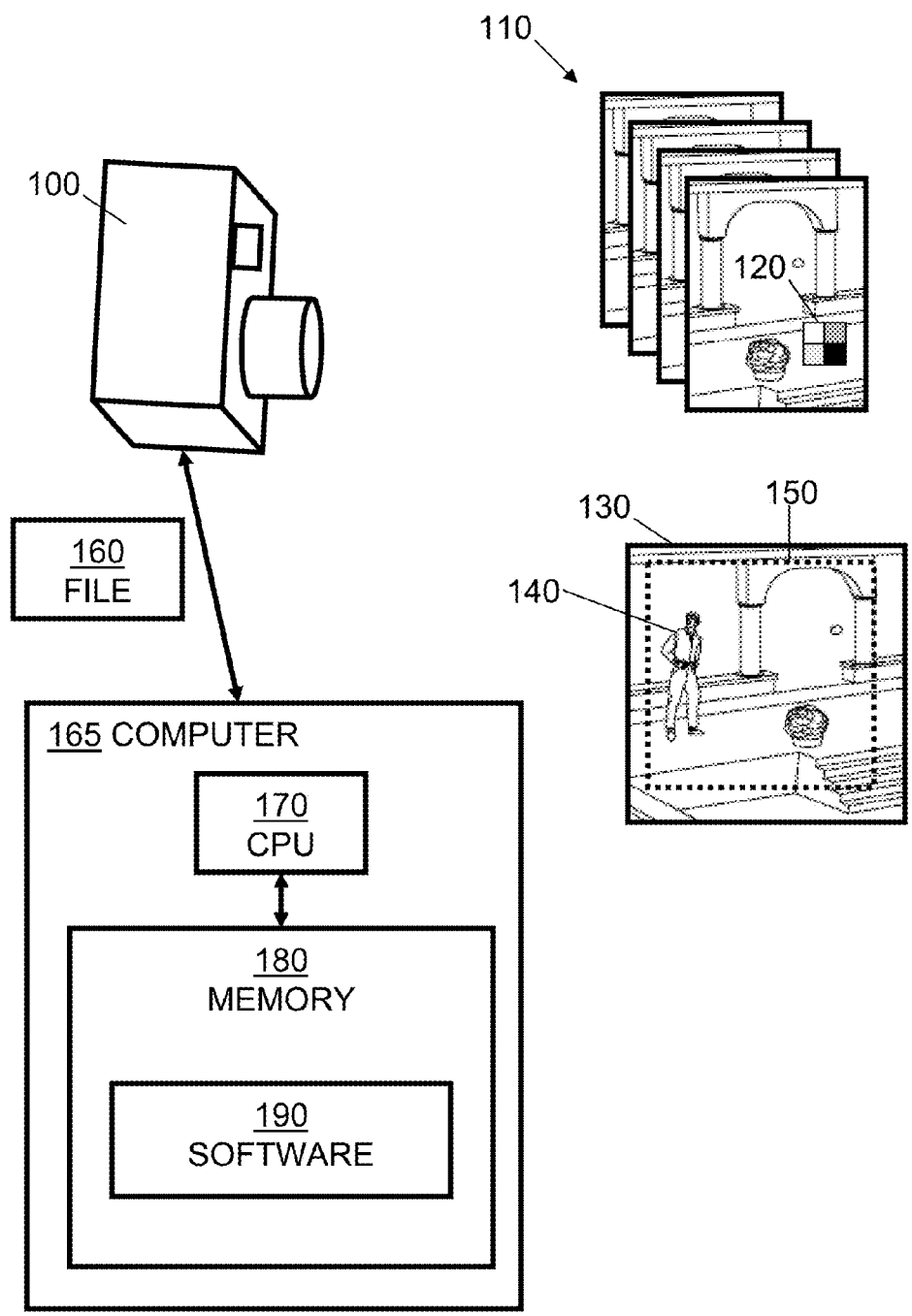
FIG. 1 is a block diagram of one embodiment of the invention, that includes a series of calibration images and a subject image.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 10 that is suitable to implement the software and/or hardware techniques associated with the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, any suitable combination of the foregoing, or a future developed computer readable storage medium. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The connection may be physical or wireless.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

FIG. 1 is a block diagram of one embodiment of the invention. A digital capture device 100 may be a digital single-lens-reflex camera ("dSLR"), digital video camera, a cellular phone with an embedded digital camera, an MP3 player with an embedded digital video camera, or other device that is designed to capture digital images. The digital capture device 100 is used to capture a series of calibration images 110 illuminated by a light source. The light source has a distribution of frequencies that cycles over a fixed time period. For example, the light source may be a fluorescent light with a cycle of 60 times per second.

The calibration images 110 include a calibration target 120 that contains a color reference region. The calibration target 120 may be a neutral grey card that is commonly used in digital imaging. The calibration target 120 may also be the calibration product sold by Datacolor under the trademark SPYDERCUBE, the 24-color target product sold by X-Rite under the trademark COLORCHECKER, or various other products sold for color management. In some embodiments, the calibration target 120 may simply be a portion of an image that is relied upon to represent a neutral gray, white, black, or other value.

The series of calibration images 110 are made at short exposure times and in rapid sequence. For example, the exposure time may be 1/4000 second and there may be one exposure every 1/120 second. Of course, other exposure time and sequence timings may be used. The series of calibration images 110 are captured over a calibration period that is greater than or equal to the fixed time period of the light source. Current technology of capture devices 100 may achieve these short exposure times and sequence timings by using a low pixel resolution. For example, one embodiment of the invention may capture calibration images 110 at a low 200 by 200 pixel resolution. Other embodiments may use lower or higher resolutions.

Calibration images 110 are stored electronically as files 160. In some embodiments the files 160 are stored in any of a number of raw file formats, each of which is proprietary to a single camera manufacturer, and each of which is typically specific to a given make and model of camera. Such proprietary file formats are referred to here as "RAW" files. In other embodiments, the files 160 are stored as JPG format files. Other file format types may also be used. When each calibration image 110 is made, a time identifier is associated to the calibration image 110. In some embodiments, the time identifier is stored as part of file 160. For example, the time identifier may be stored as part of the RAW or JPG file. In other embodiments of the invention, the time identifier may be stored separately from the files 160.

From the calibration images 110 and associated time identifiers, various embodiments of the invention create the time-varying color spectrum model. For each calibration image 110, an embodiment of the invention uses the color reference region of the calibration target in the image and applies a color-balance technique. Such color-balance techniques are well known in the art. For example, in one embodiment, the color reference region includes a neutral gray and the invention determines the color balance adjustment value for the image. Such a color balance adjustment is the color temperature needed to map the actual color values for red, green, and blue in the calibration image to a neutral grey where the red value, the green value, and the blue value are all the same value. The color balance adjustment may be expressed in degrees Kelvin.

Because a time identifier is associated with each of the calibration images 110, the color balance adjustments for the images may be associated with the time identifiers. For example, a series of 64 calibration images 110 may result in the following data:

| Time (seconds) | Color Temperature (Kelvins) |
|---|---|
| 0.00 | 5200 |
| 0.02 | 5357 |
| 0.03 | 5512 |
| 0.05 | 5663 |
| 0.07 | 5810 |
| 0.08 | 5950 |
| 0.10 | 6081 |
| 0.12 | 6203 |
| 0.13 | 6314 |
| 0.15 | 6413 |
| 0.17 | 6499 |
| 0.18 | 6570 |
| 0.20 | 6626 |
| 0.22 | 6667 |
| 0.23 | 6692 |
| 0.25 | 6700 |
| 0.27 | 6692 |
| 0.28 | 6668 |

-continued

| Time (seconds) | Color Temperature (Kelvins) |
|---|---|
| 0.30 | 6627 |
| 0.32 | 6571 |
| 0.33 | 6500 |
| 0.35 | 6415 |
| 0.37 | 6316 |
| 0.38 | 6205 |
| 0.40 | 6083 |
| 0.42 | 5952 |
| 0.43 | 5812 |
| 0.45 | 5666 |
| 0.47 | 5514 |
| 0.48 | 5359 |
| 0.50 | 5202 |
| 0.52 | 5046 |
| 0.53 | 4891 |
| 0.55 | 4739 |
| 0.57 | 4592 |
| 0.58 | 4452 |
| 0.60 | 4321 |
| 0.62 | 4198 |
| 0.63 | 4087 |
| 0.65 | 3988 |
| 0.67 | 3903 |
| 0.68 | 3831 |
| 0.70 | 3774 |
| 0.72 | 3733 |
| 0.73 | 3709 |
| 0.75 | 3700 |
| 0.77 | 3708 |
| 0.78 | 3732 |
| 0.80 | 3772 |
| 0.82 | 3828 |
| 0.83 | 3899 |
| 0.85 | 3984 |
| 0.87 | 4083 |
| 0.88 | 4193 |
| 0.90 | 4315 |
| 0.92 | 4446 |
| 0.93 | 4586 |
| 0.95 | 4732 |
| 0.97 | 4884 |
| 0.98 | 5039 |
| 1.00 | 5200 |
| 1.02 | 5357 |
| 1.03 | 5512 |
| 1.05 | 5663 |

As explained above, the series of calibration images 110 are captured over a calibration period that is greater than or equal to the fixed time period of the light source. In the example from the above data table, if the light source was a fluorescent light with a 60 times per second cycle, the series of 64 calibration images captured over 1.05 seconds exceeds the fixed time period of the light source and provides sufficient sampling for various embodiments of the invention.

Figure 2:
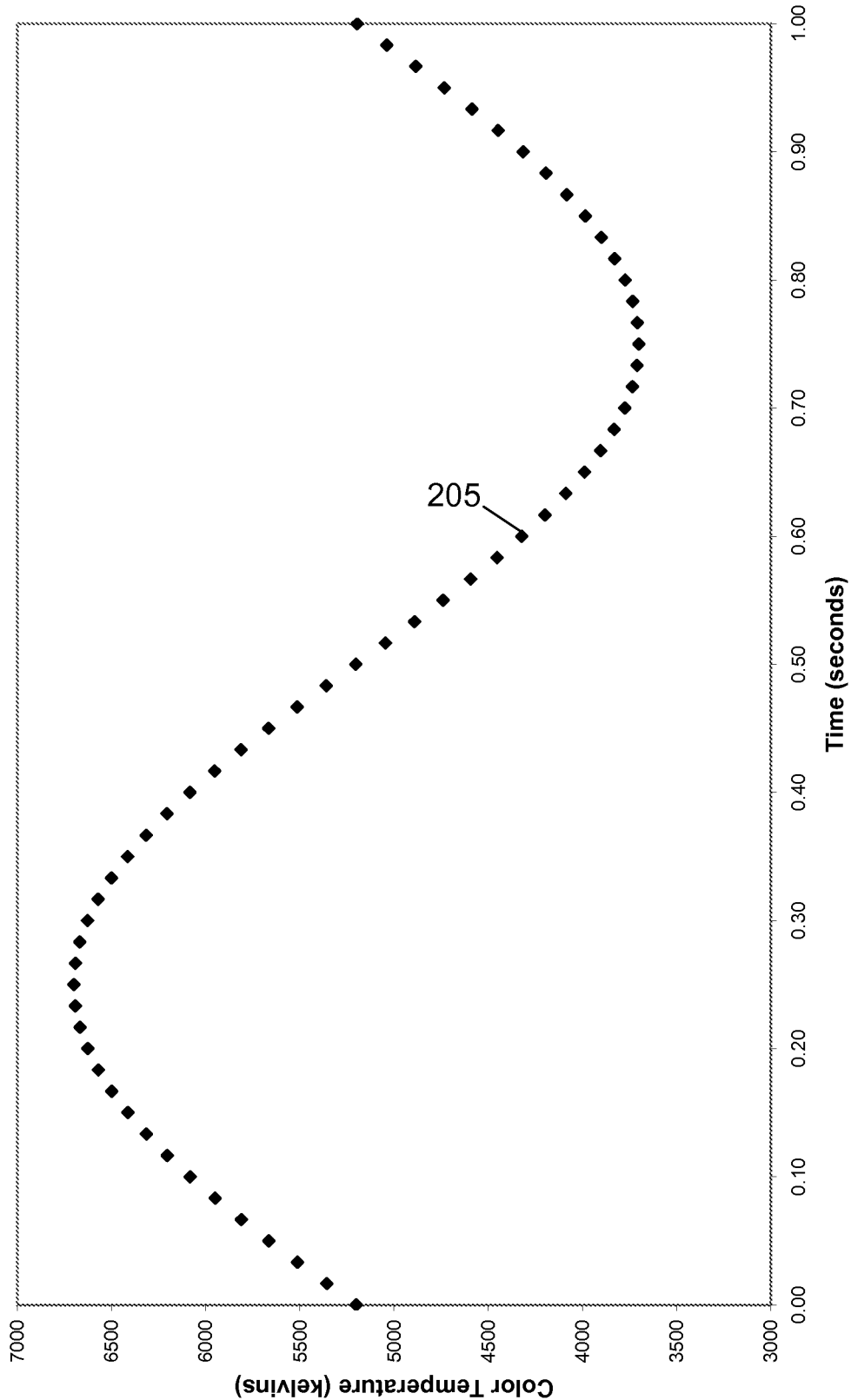
FIG. 2 is a graph plotting color temperature data points for a light source over time.
Figure 3:
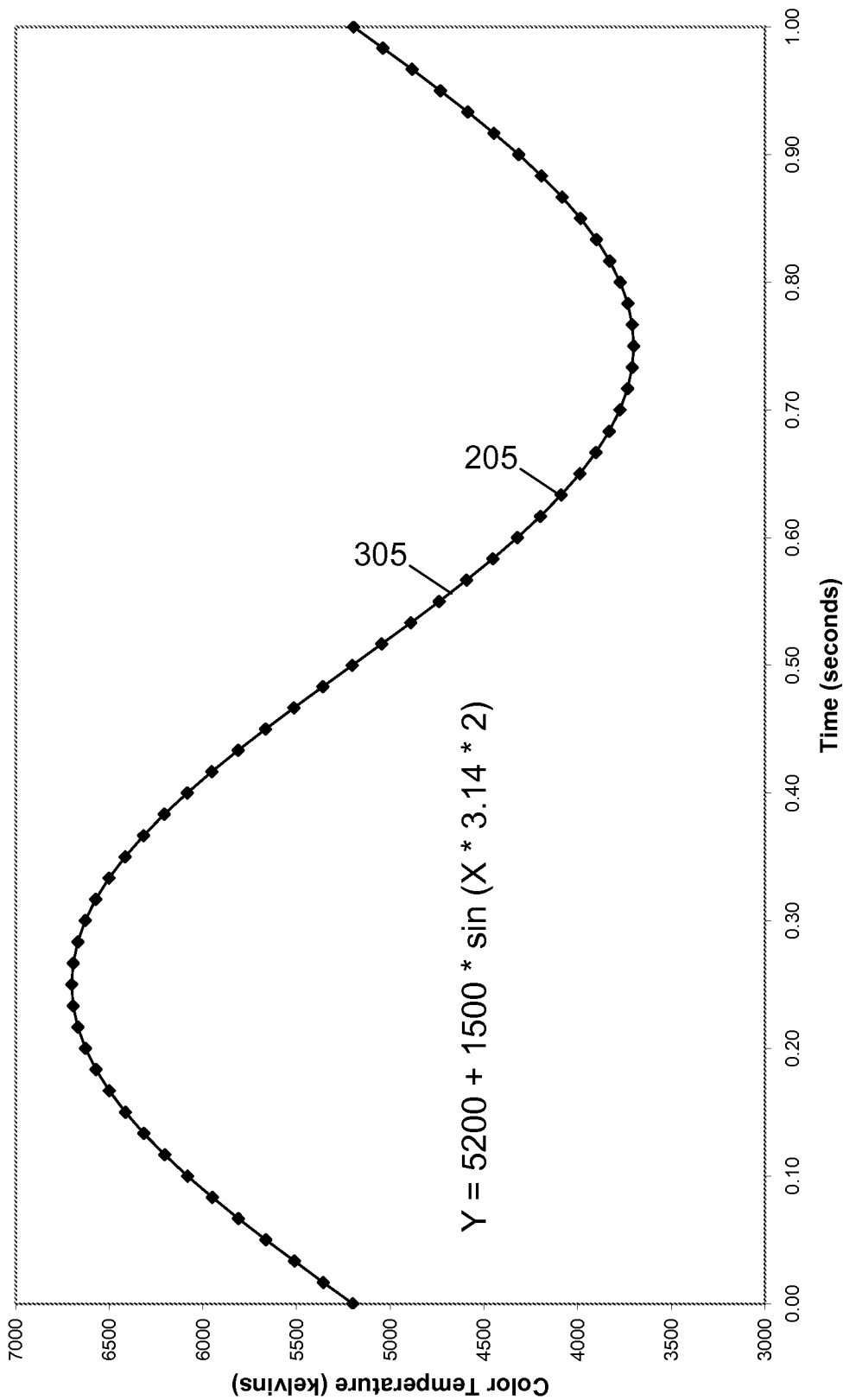
FIG. 3 illustrates a color spectrum model calculated by the graph of FIG. 2.

FIG. 2 is a graph plotting color temperature color balance adjustment data points 205 along the Y-axis against the time identifiers on the X-axis, from data points contained in the above data table. In some embodiments, the invention determines a function 305 that describes the collected data points. Such a function is shown in FIG. 3, and is a analytic representation of the time-varying color spectrum model of the invention. This spectrum model comprehends how the color temperature of the light source varies over time during its entire fixed period time cycle. The information in the model is absolute with respect to time. Thus, the model can output what the color temperature of the light source was at any point in time during the session when the images were captured. For example, FIG. 4 illustrates a color balance adjustment indicated by the color spectrum model of FIG. 3. As FIG. 4 indicates, at 0.62 seconds, the color balance adjustment value 405 is 4198 degrees Kelvins. Thus, the model can provide information for appropriate color correction at any time during the interval in which the calibration images were captured. In addition, the model can also provide information for appropriate color correction at times after (or before) the interval in which the calibration images were captured. The invention provides the ability to extrapolate from the information captured during the calibration interval, to correct images taken before or after the calibration interval. For example, if the series of calibration images is captured between 12:45:15 and 12:45:17; the model may also be used to color-correct images taken from 12:50 through 13:50. This is possible because of the repeating cyclic nature of the variation of the light source.

FIGS. 2 through 4 are only explanatory. Embodiments of the present invention do not generate such actual graphs. Rather, the calibration images 110 that are stored electronically as files 160 are processed by software 190 in a memory 180 of a computer 165 that has a CPU 170 and the time-varying color spectrum model is generated and stored as a data structure or otherwise in memory 180. In some embodiments, computer 165 is separate from the capture device 100. Such a computer 165 may be a local personal computer by which the capture device can be directly connected. Or such a computer 165 may be a remote computer that is accessed over the Internet or other network. In yet other embodiments, computer 165 may be within the capture device 100 itself.

Thus far, embodiments of the present invention that use calibration images 110 to generate a spectrum model have been explained. Some embodiments of the invention leverage an existing spectrum model to color-correct images. Returning now to FIG. 1, the capture device 100 is used to capture a subject image 150 of a subject 130. The subject image 150 is illuminated by the same light source that illuminated the calibration images 110. As with the calibration images 110, the subject image 150 is stored electronically as a file 160. In some embodiments the file 160 is a RAW file, a JPG file, or other file type. When the subject image 150 is made, exposure time data is associated to the subject image 150. In some embodiments, the exposure time data is stored as part of file 160. For example, the exposure time data may be stored as part of the RAW or JPG file. In other embodiments of the invention, the exposure time data may be stored separately from the file 160. Capture device 100 may capture a series of subject images 150, although for simplicity, only one subject image 150 is shown in FIG. 1.

FIG. 5A illustrates how certain embodiments of the invention calculate a color balance adjustment for the subject image 150 based on the exposure time data associated with the subject image 150. In the example shown in FIG. 5A, the exposure time data correlates to time 0.62 from the model. Thus, the color balance adjustment 510.1 is 4321 degrees Kelvins. Leveraging the color spectrum model, embodiments of the present invention may correct the color balance in a series of subject images automatically.

Embodiments of the invention may also uses the exposure time information in the image file 160 (often embedded as metadata) to make a decision on what type of color balance correction is needed for the image. For a subject image 150 receiving the same integrated light exposure, the image may require only a single color balance correction applied to the entire image file 160. Using FIG. 5A as an example of this, a 4321 degrees Kelvin color balance may be applied to all of the pixels of the image file 160.

Figure 5B:
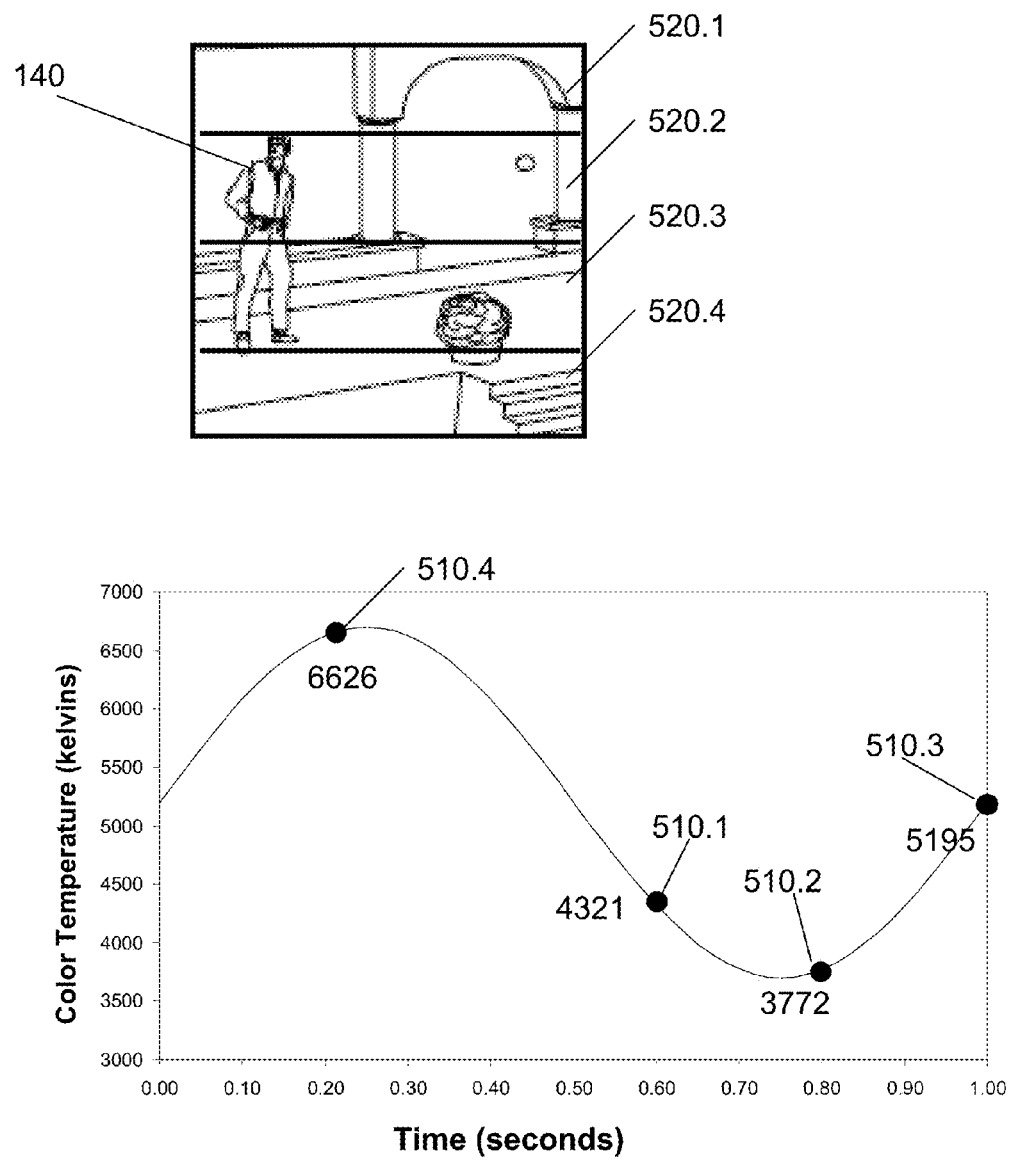
FIG. 5B illustrates calculating a series of color balance adjustments for the subject image, in which adjustments are applied to horizontal regions.
Figure 5C:
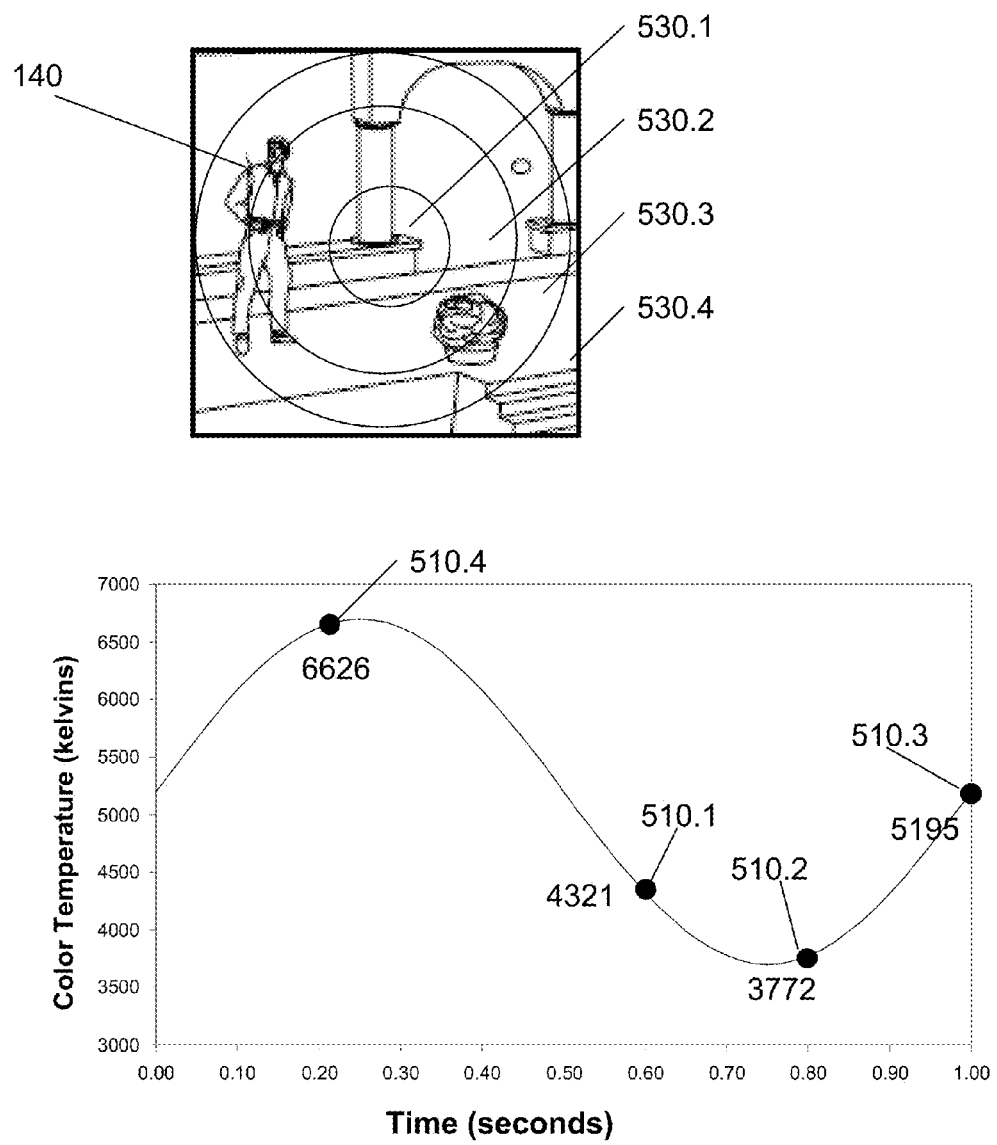
FIG. 5C illustrates calculating a series of color balance adjustments for the subject image, in which adjustments are applied to radial regions.

However, for images where the exposure time is short compared to fixed time period of the light source's cycle, the subject image 150 will show a color cast which varies in regions of the image. FIG. 5B illustrates how an embodiment of the invention may determine that the subject image may be treated as having four horizontal regions 520.1 through 520.4. Embodiments of the invention may calculate that a first color balance adjustment of 4321 degrees Kelvins be applied to the first horizontal region 520.1, a second color balance adjustment of 3772 degrees Kelvins be applied to the second horizontal region 520.2, a third color balance adjustment of 5195 degrees Kelvins be applied to the third horizontal region 520.3, and a fourth color balance adjustment of 6626 degrees Kelvins be applied to the fourth horizontal region 520.4. Such horizontal bands in a subject image may occur because certain dSLRs use a narrow slit moving at high speed across the surface of the imaging sensor to control exposure time. For such images, embodiments of the invention use its color spectrum model to create an appropriate color temperature gradient, and apply that gradient to the image file. Other embodiments of the invention may support vertical regions within the subject image. FIG. 5C shows radial regions 530.1, 530.2, 530.3 and 530.4 that certain embodiments may support for capture devices 110 that have a radially-opening shutter.

Figure 6A:
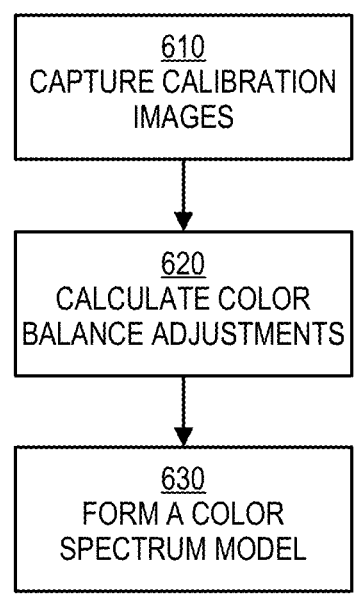
FIGS. 6A and 6B are flowcharts of exemplary steps of an embodiment of the invention.
Figure 6B:
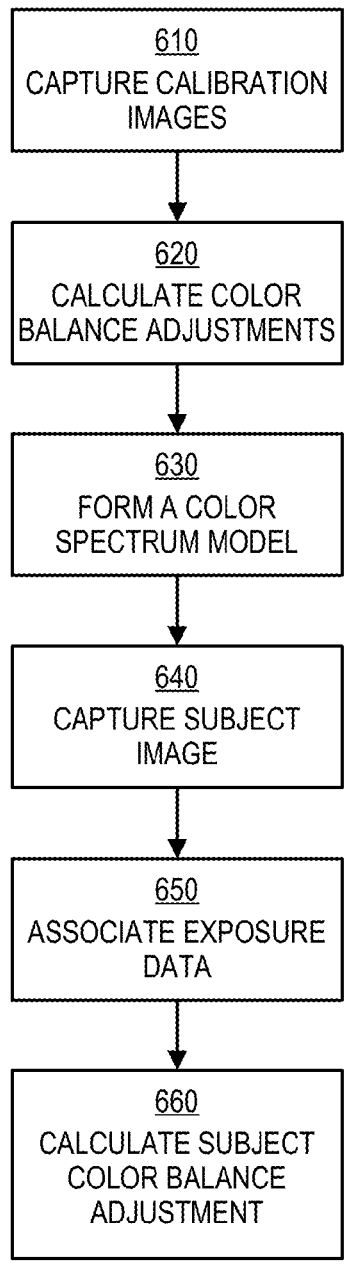

FIGS. 6A and 6B are flowcharts of exemplary steps of an embodiment of the invention. In FIG. 6A, a first step 610 of an embodiment of the invention involves capturing a series of calibration images 110 of a calibration target 120 having a color reference region that is illuminated by a light source having a distribution of frequencies that cycles over a fixed time period. Such calibration images 110 are captured over a calibration period that is greater than or equal to the fixed time period. Each calibration image 110 is associated to a time identifier.

In the second step 620, the embodiment of the invention calculates a color balance adjustment for each of the calibration images 110 and from these adjustments, at step 630 form a color spectrum model of the color balance adjustments. The color spectrum model models the changes in the light source over its fixed time period.

FIG. 6B illustrates a flowchart of another embodiment of the invention in which after step 630, at step 640 one or more subject images 150 (that are illuminated by the light source that illuminated the calibration target 120) are captured for a determined exposure time. At step 650 exposure time data is associated to the subject image 150. At step 660, one or more subject color balance adjustments are calculated for the subject image 150 from the color spectrum model.

The embodiments of the invention so far discussed are used to correct color balance in an image that was illuminated by light source(s) that are assumed to emit frequencies that are distributed as would be expected from an ideal black-body object heated to a given temperature, per the common definition of color temperature.

As a result, FIG. 2 shows that a single data point (i.e., the color temperature of the light source(s)) can be plotted for a particular point in time. One skilled in the art will recognize that the invention can be extended to provide a collection of color calibration profiles, in which a color calibration profile (rather than a color temperature) can be associated with each point in time.

Such an embodiment is used when the light source(s) do not emit a distribution of frequencies which is well described by a single color temperature. One skilled in the art will recognize that light sources can have spectra which differ from that which is well described by a single color temperature.

The previous discussion described that a single color balance adjustment may be generated by analyzing a color reference region that is known to be neutral gray. By extension, a plurality of color adjustments making up a color calibration profile may be generated by analyzing more than one known color reference region. For example, the target product sold by X-Rite under the trademark COLORCHECKER includes 24 color reference areas. For simplicity of discussion here, one color reference region may be a neutral gray, a second color reference region may be red, a third color reference region may be green, a fourth color reference region may be blue, a fifth color reference region may be orange, a sixth color reference region may be yellow, and so on. The white balance color correction determined by analysis of a single neutral gray target can be expanded to an analysis of a collection of differently colored regions from the color reference target to permit creation of a color spectrum model which is not a single number for color temperature (with its underlying assumptions about distribution of frequencies) but is a color calibration profile, which contains within it information about the actual distribution of frequencies for the light source being modeled.

As one example, such an embodiment of the invention is useful when images are taken in which the illumination is provided by high-intensity mercury lamps. Such mercury lamps do not exhibit a distribution of frequencies which is accurately described by a single color temperature. By generating a set of color calibration profiles, images may be adjusted so that the appearance of red, green, blue, orange, yellow, and so on in the image matches the various known color reference regions.

The flowcharts of FIGS. 6A and 6B demonstrate how embodiments of the invention can be methods. The invention may also be embodied as a system. In such a system, software 190 in memory 180 of computer 165 includes a color balance adjustor module, an exposure module, a time association module, and a calculator module. Yet other embodiments of the invention are computer program products of computer readable storage medium having computer readable program code. One skilled in the art will understand from the above description and the Figures how the invention may be embodied as a method, a system, and a computer program product.

Figure 7:
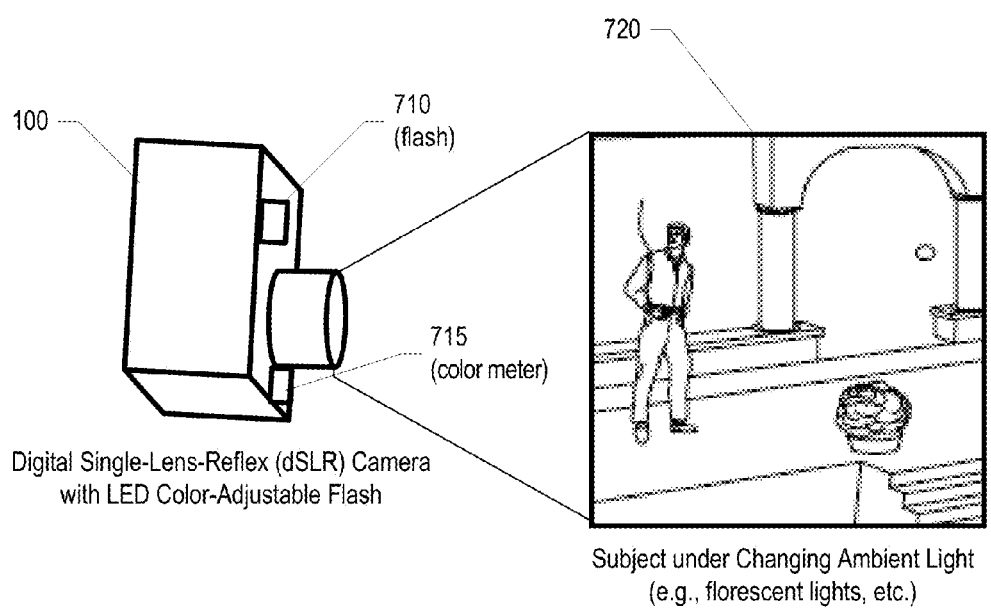
FIG. 7 is a block diagram of one embodiment of the invention that depicts a flash-equipped digital camera capturing images with an LED color-adjustable flash.

FIG. 7 is a block diagram of one embodiment of the invention that depicts a flash-equipped digital camera capturing images with an LED color-adjustable flash. Digital capture device 100 may be a digital single-lens-reflex camera ("dSLR"), digital video camera, a cellular phone with an embedded digital camera, an MP3 player with an embedded digital video camera, or other device that is designed to capture digital images. This device is equipped with flash unit 710 that is color-adjustable, such as a light emitting diode (LED) color-adjustable flash unit. While flash unit 710 is shown incorporated within dSLR 100, the flash unit may be an external flash unit that receives signals from dSLR through a wired or wireless connection with the signals setting the color temperature of the flash unit and triggering the flash. In addition, color meter 715 is accessible from the dSLR. In the embodiment shown, color meter 715 is shown incorporated within dSLR. However, similar to the flash unit, the color meter can be an external device that communicates with the dSLR using wired or wireless signals. Here, the dSLR requests the color meter to collect data corresponding to the ambient light illuminating physical environment 720, such as an environment illuminated using florescent lights with a color temperature that changes (cycles) over a fixed time period.

When requested, color meter 715 collects data corresponding to the ambient light of the physical environment 720 with the ambient lighting having a distribution of color temperatures that cycle over a period of time, such as found with certain types of lights (e.g., florescent, etc.). The data collected by light meter 715 is provided to dSLR 100. The dSLR receives a flash request, such as from a photographer that is using the dSLR. The relatively short time delay between the request and the time needed to flash flash unit 710 is used to calculate a time at which the flash unit will actually flash. Using this time delay, the dSLR identifies the current color temperature of the ambient light and adds the time delay to identify (predict) the color temperature that will be present in physical environment 720 when the flash occurs. The flash unit is set to the identified color temperature by the dSLR. Now, when the flash occurs, the flash will be at the same color temperature as found in the physical environment.

Figure 8:
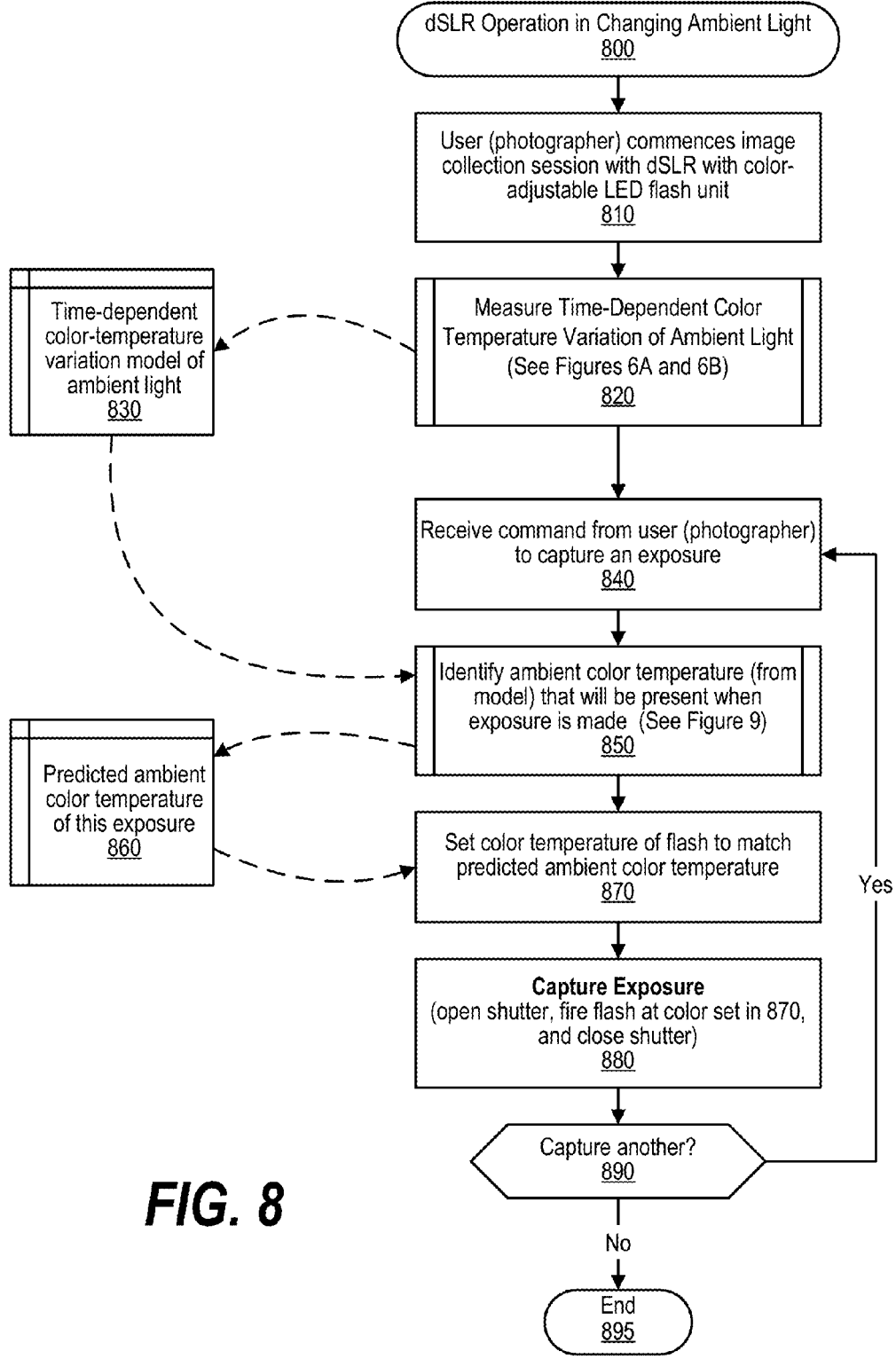
FIG. 8 is a flowchart showing steps performed by the LED flash-equipped digital camera operating in an environment of changing ambient light.

FIG. 8 is a flowchart showing steps performed by the LED flash-equipped digital camera operating in an environment of changing ambient light. Processing commences at 800 whereupon, at step 810, a photographer starts an image collection session with a camera equipped with a color-adjustable flash unit, such as a digital single-lens reflex camera (dSLR) equipped with a color-adjustable LED flash unit.

At predefined process 820, the dSLR measures the time-dependent color temperature variation of ambient light that is illuminating the physical location where the photographer wishes to capture images (see FIGS. 6A and 6B and corresponding text for processing details relating to the measurement of time-dependent color temperature variation of the ambient light). For example, the physical location may be lighted using florescent lights which have a color temperatures that changes (cycles) over a fixed period of time due to the characteristics of the lights. A color meter, accessible from or incorporated in the dSLR is used to collect the data corresponding to the ambient light found in the physical environment over a period of time. A time-dependent color-temperature variation model of the ambient light is generated and stored in memory area 830, such as a memory included in the dSLR and accessible by one or more processors found in the dSLR.

At step 840, a command is received from the photographer to capture an exposure. For example, the command may be received when the photographer presses a button that triggers the dSLR to capture an image. At predefined process 850, the dSLR uses the time-dependent color-temperature variation model of the ambient light stored in memory area 830 to identify the ambient color temperature that will be present when the exposure is made with the dSLR's lens (see FIG. 9 and corresponding text for processing details regarding identifying the ambient color temperature that will be present). The identified ambient color temperature to use for this exposure is stored in memory area 860. At step 870, the dSLR sets the color-temperature of the flash unit (e.g., the attached or incorporated LED flash unit, etc.) to the predicted ambient color temperature stored in memory area 860. At step 880, an exposure is captured by opening the shutter of the dSLR, firing the flash at the color set in step 870, and closing the dSLR's shutter.

A decision is made as to whether the photographer wishes to capture another image (exposure) under the same ambient lighting conditions (decision 890). If the photographer wishes to capture another image under these ambient lighting conditions, then decision 890 branches to the "yes" branch which loops back to identify (predict) the ambient color temperature that will be present when the next exposure is taken, set the flash unit's color temperature, and capture the exposure as described above. This looping continues until the photographer is finished capturing images under the ambient lighting conditions, at which point decision 890 branches to the "no" branch and processing ends at 895. In addition, if the ambient lighting conditions change (e.g., the photographer moves to a different physical environment, such as another room with different ambient lighting, etc.), then the collection of the data corresponding to the (new) ambient lighting conditions are performed using predefined process 820 which results in a new color-temperature variation model being stored in memory area 830. The determination that the ambient lighting conditions have changed can be either a manual decision made by the photographer or can be automatically performed using the color meter to periodically identify the ambient lighting conditions and compare them to the previously stored conditions. If the ambient lighting conditions have changed, then an updated color-temperature variation model can be generated and stored in memory area 830. This embodiment may be useful if the photographer is moving about a physical environment, such as at a house or building, taking various exposures under differing ambient lighting conditions.

Figure 9:
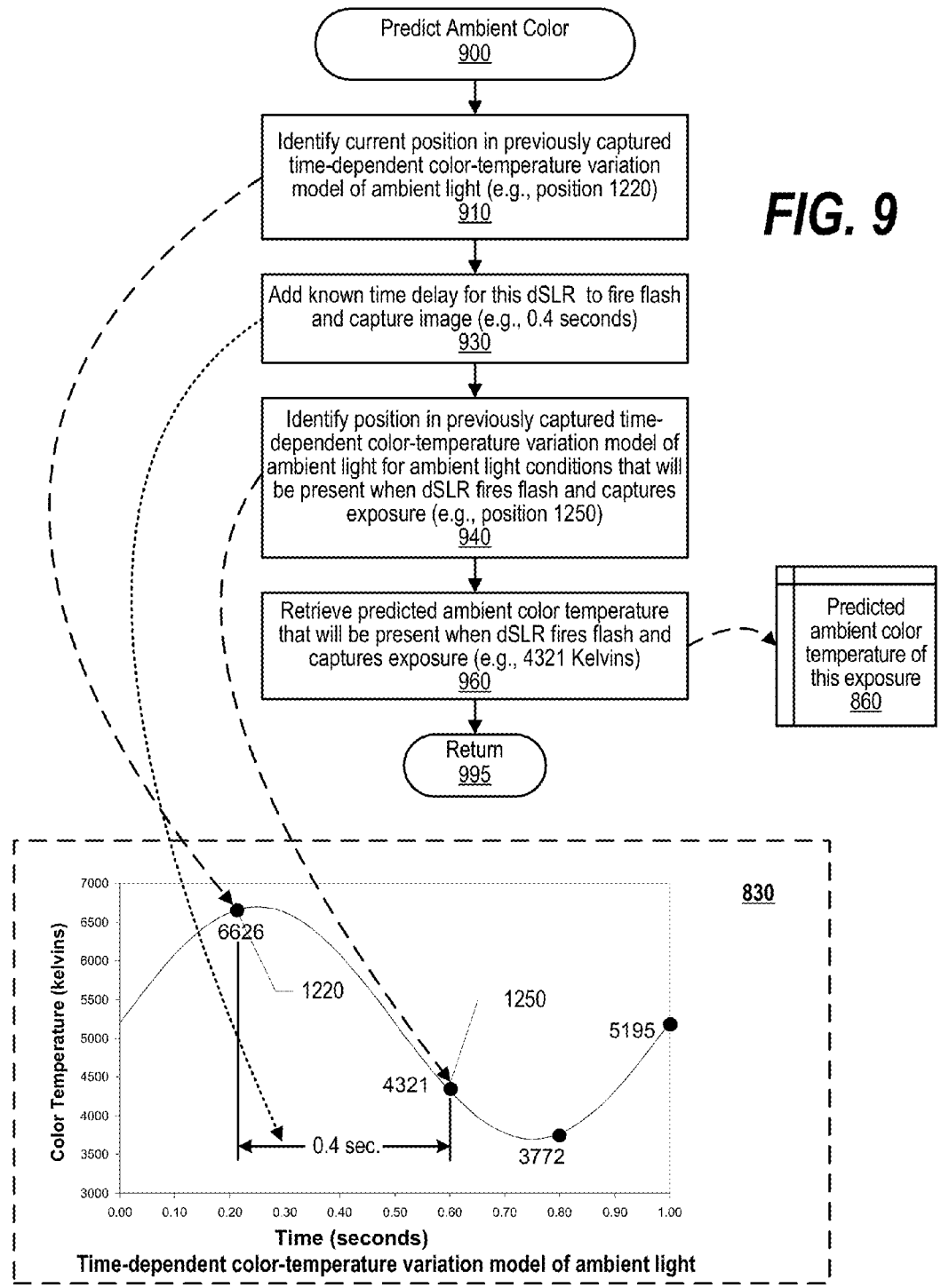
FIG. 9 is a flowchart showing steps performed by the LED flash-equipped digital camera to predict the ambient color temperature that will be present when an image is captured by the camera.

FIG. 9 is a flowchart showing steps performed by the LED flash-equipped digital camera to predict the ambient color temperature that will be present when an image is captured by the camera. Processing commences at 900 when the routine shown in FIG. 9 is called by the process shown in FIG. 8 (see, e.g., predefined process 850 in FIG. 8). In FIG. 9, the process performed by the dSLR commences by identifying a current position in the previously captured time-dependent color-temperature variation model of the ambient lighting conditions stored in memory area 830. The color-temperature of the ambient light has a distribution of color temperatures that cycle over a fixed time period. In the example shown, the current position in the model shows that the current color-temperature of the ambient light is 6626 degrees Kelvin. As shown, the cycle of color temperatures forms a repeating sinusoidal wave with an amplitude corresponding to the color temperature and a frequency corresponding to the number of cycles (oscillations) that occur in a time interval. In the example shown, for simplicity, the frequency is one cycle per second, however in a more realistic environment the frequency is likely to be many times per second (e.g., 60 times per second, etc.).

At step 930, a known time delay is added with the known time delay being the amount of time needed to fire the flash at the flash unit. In the example shown, the time delay is 0.4 seconds. At step 940, the dSLR identifies a position in the previously captured time-dependent color-temperature variation model of the ambient light conditions that will be present in the physical environment. As shown, the identified position corresponds to another color-temperature. In the example shown, the color-temperature of the ambient light that is expected (predicted) to be illuminating the physical environment is 4321 degrees Kelvin. At step 960, the color-temperature is retrieved from the model and stored in memory area 860. As shown in FIG. 8, the dSLR will set the color temperature of the flash unit to the predicted color-temperature stored in memory area 860. Processing thereupon returns to the calling routine (see FIG. 8) at 995.

FIG. 10 illustrates information handling system 1000, which is a simplified example of a computer system capable of performing the computing operations described herein. Information handling system 1000 includes one or more processors 1010 coupled to processor interface bus 1012. Processor interface bus 1012 connects processors 1010 to Northbridge 1015, which is also known as the Memory Controller Hub (MCH). Northbridge 1015 connects to system memory 1020 and provides a means for processor(s) 1010 to access the system memory. Graphics controller 1025 also connects to Northbridge 1015. In one embodiment, PCI Express bus 1018 connects Northbridge 1015 to graphics controller 1025. Graphics controller 1025 connects to display device 1030, such as a computer monitor.

Northbridge 1015 and Southbridge 1035 connect to each other using bus 1019. In one embodiment, the bus is a Direct Media Interface (DMI) bus that transfers data at high speeds in each direction between Northbridge 1015 and Southbridge 1035. In another embodiment, a Peripheral Component Interconnect (PCI) bus connects the Northbridge and the Southbridge. Southbridge 1035, also known as the I/O Controller Hub (ICH) is a chip that generally implements capabilities that operate at slower speeds than the capabilities provided by the Northbridge. Southbridge 1035 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 1096 and "legacy" I/O devices (using a "super I/O" chip). The "legacy" I/O devices (1098) can include, for example, serial and parallel ports, keyboard, mouse, and/or a floppy disk controller. The LPC bus also connects Southbridge 1035 to Trusted Platform Module (TPM) 1095. Other components often included in Southbridge 1035 include a Direct Memory Access (DMA) controller, a Programmable Interrupt Controller (PIC), and a storage device controller, which connects Southbridge 1035 to nonvolatile storage device 1085, such as a hard disk drive, using bus 1084.

ExpressCard 1055 is a slot that connects hot-pluggable devices to the information handling system. ExpressCard 1055 supports both PCI Express and USB connectivity as it connects to Southbridge 1035 using both the Universal Serial Bus (USB) the PCI Express bus. Southbridge 1035 includes USB Controller 1040 that provides USB connectivity to devices that connect to the USB. These devices include webcam (camera) 1050, infrared (IR) receiver 1048, keyboard and trackpad 1044, and Bluetooth device 1046, which provides for wireless personal area networks (PANs). USB Controller 1040 also provides USB connectivity to other miscellaneous USB connected devices 1042, such as a mouse, removable nonvolatile storage device 1045, modems, network cards, ISDN connectors, fax, printers, USB hubs, and many other types of USB connected devices. While removable nonvolatile storage device 1045 is shown as a USB-connected device, removable nonvolatile storage device 1045 could be connected using a different interface, such as a Firewire interface, etcetera.

Wireless Local Area Network (LAN) device 1075 connects to Southbridge 1035 via the PCI or PCI Express bus 1072. LAN device 1075 typically implements one of the IEEE 802.11 standards of over-the-air modulation techniques that all use the same protocol to wireless communicate between information handling system 1000 and another computer system or device. Optical storage device 1090 connects to Southbridge 1035 using Serial ATA (SATA) bus 1088. Serial ATA adapters and devices communicate over a high-speed serial link. The Serial ATA bus also connects Southbridge 1035 to other forms of storage devices, such as hard disk drives. Audio circuitry 1060, such as a sound card, connects to Southbridge 1035 via bus 1058. Audio circuitry 1060 also provides functionality such as audio line-in and optical digital audio in port 1062, optical digital output and headphone jack 1064, internal speakers 1066, and internal microphone 1068. Ethernet controller 1070 connects to Southbridge 1035 using a bus, such as the PCI or PCI Express bus. Ethernet controller 1070 connects information handling system 1000 to a computer network, such as a Local Area Network (LAN), the Internet, and other public and private computer networks.

While FIG. 10 shows one information handling system, an information handling system may take many forms. For example, an information handling system may take the form of any information handling system capable of performing the functions and steps described herein. In one embodiment, the information handling system is a digital camera, such as a digital single-lens reflex camera (dSLR) equipped with a flash unit, such as a color-adjustable light emitting diode (LED) flash unit. In addition, an information handling system may take other form factors such as a personal digital assistant (PDA), a gaming device, ATM machine, a portable telephone device, a communication device or other devices that include a processor and memory.

What is claimed is:

1. An information handling system to adjust illumination color temperature, the information handling system comprising:
one or more processors;
a memory coupled to at least one of the processors;
a flash unit accessible by at least one of the processors;
a set of instructions stored in the memory and executed by at least one of the, wherein the set of instructions perform actions comprising:
collecting data corresponding to ambient light of a physical environment, wherein the ambient light has a distribution of color temperatures that cycle over a fixed time period, and wherein the collected data corresponds to the cycle of color temperatures;
receiving a flash request;
calculating a time at which the flash unit will flash in response to the received flash request;
identifying one of the color temperatures from the distribution of color temperatures, wherein the identified color temperature is a prediction of the color temperature of the ambient light that will be present in the physical environment when the flashing of the flash unit occurs;
setting a color temperature of the flash unit to the identified color temperature; and
flashing the flash unit after setting the color temperature.

2. The information handling system of claim 1 wherein the identifying further includes additional actions comprising:
identifying a current position in the cycle of color temperatures corresponding to the ambient light; and
adding a predetermined time delay to identify a future position in the cycle of color temperatures, wherein the predetermined time delay corresponds to an amount of time taken to flash the flash unit, and wherein the identified color temperature corresponds to a color at the future position in the cycle of color temperatures.

3. The information handling system of claim 1 wherein the flash unit is a color-adjustable LED flash unit.

4. The information handling system of claim 1 wherein the set of instructions perform additional actions comprising:
generating a time-dependent color-temperature variation model of the ambient light, wherein the time-dependent color-temperature variation model includes the cycle of color temperatures found in the ambient light of the physical environment.

5. The information handling system of claim 1 wherein the cycle of color temperatures is a sinusoidal wave with an amplitude corresponding to the plurality of color temperatures found in the ambient light of the physical environment and an angular frequency corresponding to a number of oscillations that occur in a time interval.

6. The information handling system of claim 1 further comprising:
   a camera lens;
   a shutter, wherein the set of instructions perform additional actions comprising:
      receiving an exposure capture request from a user of the information handling system, wherein the flash unit is a color-adjustable LED flash unit;
      opening the shutter of the digital camera, wherein the flashing of the flash unit with the color temperature set to the identified color occurs while the shutter is opened;
      closing the shutter;
      capturing a digital image taken with the color-adjustable LED flash unit set to the identified color temperature; and
      storing the captured digital image in a memory area of the memory.

7. The information handling system of claim 6 wherein the information handling system is a digital single-lens reflex camera.

8. The information handling system of claim 7 further comprising:
   a color temperature meter that receives the data corresponding to the ambient light of the physical environment, wherein the set of instructions perform additional actions comprising:
      activating the color temperature meter prior to the user requesting the exposure request; and
      storing color temperature data received by the color temperature meter in a second memory area of the memory.

9. The information handling system of claim 8 wherein the set of instructions perform additional actions comprising:
   analyzing the stored color temperature data; and
   generating the cycle of color temperatures based on the analysis of the stored color temperature data, wherein the cycle of color temperatures is a sinusoidal wave with an amplitude corresponding to the plurality of color temperatures found in the ambient light of the physical environment and an angular frequency corresponding to a number of oscillations that occur in a time interval.

10. A computer program product stored in a computer readable memory, comprising computer readable program code that, when executed by an information handling system, causes the information handling system to adjust illumination color temperature by performing actions comprising:
   collecting data corresponding to ambient light of a physical environment, wherein the ambient light has a distribution of color temperatures that cycle over a fixed time period, and wherein the collected data corresponds to the cycle of color temperatures;
   receiving a flash request;
   calculating a time at which a flash unit will flash in response to the received flash request;
   identifying one of the color temperatures from the distribution of color temperatures, wherein the identified color temperature is a prediction of the color temperature of the ambient light that will be present in the physical environment when the flashing of the flash unit occurs;
   setting a color temperature of the flash unit to the identified color temperature; and
   flashing the flash unit after setting the color temperature.

11. The computer program product of claim 10 wherein the identifying further comprises computer readable program code that causes the information handling system to perform additional actions comprising:
   identifying a current position in the cycle of color temperatures corresponding to the ambient light; and
   adding a predetermined time delay to identify a future position in the cycle of color temperatures, wherein the predetermined time delay corresponds to an amount of time taken to flash the flash unit, and wherein the identified color temperature corresponds to a color at the future position in the cycle of color temperatures.

12. The computer program product of claim 10 wherein the flash unit is a color-adjustable LED flash unit.

13. The computer program product of claim 10 wherein computer readable program code causes the information handling system to perform additional actions comprising:
   generating a time-dependent color-temperature variation model of the ambient light, wherein the time-dependent color-temperature variation model includes the cycle of color temperatures found in the ambient light of the physical environment.

14. The computer program product of claim 10 wherein the cycle of color temperatures is a sinusoidal wave with an amplitude corresponding to the plurality of color temperatures found in the ambient light of the physical environment and an angular frequency corresponding to a number of oscillations that occur in a time interval.

15. The computer program product of claim 10 wherein the computer readable program code causes the information handling system to perform additional actions comprising:
   receiving an exposure capture request from a user of a digital camera that includes the flash unit, wherein the flash unit is a color-adjustable LED flash unit;
   opening a shutter of the digital camera, wherein the flashing of the flash unit with the color temperature set to the identified color occurs while the shutter is opened;
   closing the shutter;
   capturing a digital image taken with the color-adjustable LED flash unit set to the identified color temperature; and
   storing the captured digital image in a memory area.

16. The computer program product of claim 15 wherein the digital camera is a digital single-lens reflex camera.

17. The computer program product of claim 16 wherein the data corresponding to the ambient light of the physical environment is received by a color temperature meter included in the digital camera, wherein the computer readable program code causes the information handling system to perform additional actions comprising:
   activating the color temperature meter prior to the user requesting the exposure request; and
   storing color temperature data received by the color temperature meter in a second memory area.

18. The computer program product of claim 17 wherein the computer readable program code causes the information handling system to perform additional actions comprising:
   analyzing the stored color temperature data; and
   generating the cycle of color temperatures based on the analysis of the stored color temperature data, wherein the cycle of color temperatures is a is sinusoidal wave with an amplitude corresponding to the plurality of color temperatures found in the ambient light of the physical environment and an angular frequency corresponding to a number of oscillations that occur in a time interval.

* * * * *